(12) United States Patent
Kanazawa

(10) Patent No.: US 11,931,903 B2
(45) Date of Patent: Mar. 19, 2024

(54) ROBOT CONTROLLER AND METHOD OF CONTROLLING ROBOT

(71) Applicant: SEIKO EPSON CORPORATION, Tokyo (JP)

(72) Inventor: Kana Kanazawa, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 119 days.

(21) Appl. No.: 16/546,745

(22) Filed: Aug. 21, 2019

(65) Prior Publication Data
US 2020/0061834 A1 Feb. 27, 2020

(30) Foreign Application Priority Data
Aug. 23, 2018 (JP) ................... 2018-155943

(51) Int. Cl.
| | |
|---|---|
| *B25J 9/16* | (2006.01) |
| *G05B 19/4063* | (2006.01) |
| *G05B 19/4065* | (2006.01) |
| *G05B 19/418* | (2006.01) |

(52) U.S. Cl.
CPC ........ *B25J 9/1674* (2013.01); *G05B 19/4063* (2013.01); *G05B 19/4065* (2013.01); *G05B 19/418* (2013.01); *G05B 2219/31356* (2013.01); *G05B 2219/32229* (2013.01); *G05B 2219/32371* (2013.01); *G05B 2219/39* (2013.01)

(58) Field of Classification Search
CPC ......... B25J 9/16; B25J 9/1674; G05B 19/406; G05B 19/4063; G05B 19/4065; G05B 19/418; G05B 19/41865; G05B 2219/39; G05B 2219/39001; G05B 2219/31337; G05B 2219/31356; G05B 2219/32224; G05B 2219/32229; G05B 2219/33315; G05B 2219/37253; G05B 2219/32371; G05B 2219/32257; Y02P 90/02; Y02P 90/80
See application file for complete search history.

(56) References Cited

U.S. PATENT DOCUMENTS

| | | | |
|---|---|---|---|
| 11,016,468 B1* | 5/2021 | Barker | G05B 19/4065 |
| 2008/0062211 A1* | 3/2008 | Kamisuwa | G03G 15/5079 347/5 |
| 2017/0153625 A1* | 6/2017 | Yamamoto | G05B 19/4184 |
| 2021/0278832 A1* | 9/2021 | Koumoto | G05B 23/0218 |

FOREIGN PATENT DOCUMENTS

| | | |
|---|---|---|
| JP | 2002-358108 | 12/2002 |
| JP | 2017-037886 | 2/2017 |
| JP | 2017-102554 | 6/2017 |
| WO | 2018-003879 | 1/2018 |

* cited by examiner

*Primary Examiner* — Khoi H Tran
*Assistant Examiner* — Sarah A Tran
(74) *Attorney, Agent, or Firm* — WORKMAN NYDEGGER (57) ABSTRACT

A controller for controlling a plurality of robots includes a failure prediction section configured to predict a failure time for each of the robots; and a load adjustment section configured to perform adjustment of a work load of each of the robots according to each of the predicted failure times, so that each of the robots operates until a maintenance time determined in common to each of the robots.

5 Claims, 5 Drawing Sheets

ROBOT CONTROLLER AND METHOD OF CONTROLLING ROBOT

The present application is based on, and claims priority from JP Application Serial Number 2018-155943, filed Aug. 23, 2018, the disclosure of which is hereby incorporated by reference herein in its entirety.

BACKGROUND

1. Technical Field

The present disclosure relates to a robot controller and a method of controlling a robot.

2. Related Art

JP-A-2017-102554 discloses a technique related to a controller that controls a robot and, for example, estimating a failure time of a component constituting the robot from an operating situation of the robot. In JP-A-2017-102554, a failure time of the robot is delayed by stopping work of a part of the robot or reducing an operation speed, so that an estimated failure time is not earlier than a predetermined replacement time of a component.

However, in JP-A-2017-102554, the timing of the component replacement when failure is predicted for a plurality of robots is not sufficiently studied. Therefore, when failure of the plurality of the robots is predicted, a maintenance time at which a component is replaced or the like varies from robot to robot, which may lower productivity.

SUMMARY

According to an aspect of the present disclosure, there is provided a controller for controlling a plurality of robots. The controller includes a failure prediction section configured to predict a failure time for each of the robots; and a load adjustment section configured to perform adjustment of a work load of each of the robots according to each of the predicted failure times, so that each of the robots operates until a maintenance time determined in common to each of the robots.

DESCRIPTION OF EXEMPLARY EMBODIMENTS

A. First Embodiment

Figure 1:
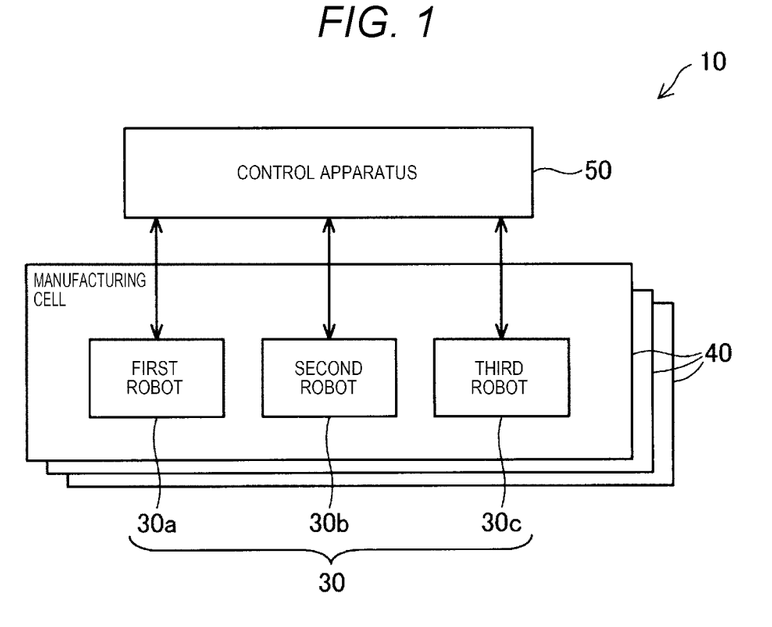
FIG. 1 is a diagram illustrating a schematic configuration of a robot system.

FIG. 1 is a diagram illustrating a schematic configuration of a robot system 10 in an embodiment. The robot system 10 includes a plurality of manufacturing cells 40 and a controller 50. Each of the manufacturing cells 40 is a set of manufacturing facility including a plurality of robots 30. Respective manufacturing cells 40 are disposed at positions distant from each other in a factory. In the embodiment, each of the manufacturing cells 40 includes a first robot 30a, a second robot 30b, and a third robot 30c. In the following, when these robots are described without distinction, they will be referred to as "robots 30". In the embodiment, the respective robots 30 in the manufacturing cell 40 individually produce and process objects. The number of the robots 30 provided in each of the manufacturing cells 40 is arbitrary. The controller 50 may be disposed in the factory where the manufacturing cells 40 are disposed or may be disposed at a position distant from the factory. The controller 50 and each of the robots 30 communicate with each other, for example, via a network such as an intranet or an Internet.

Figure 2:
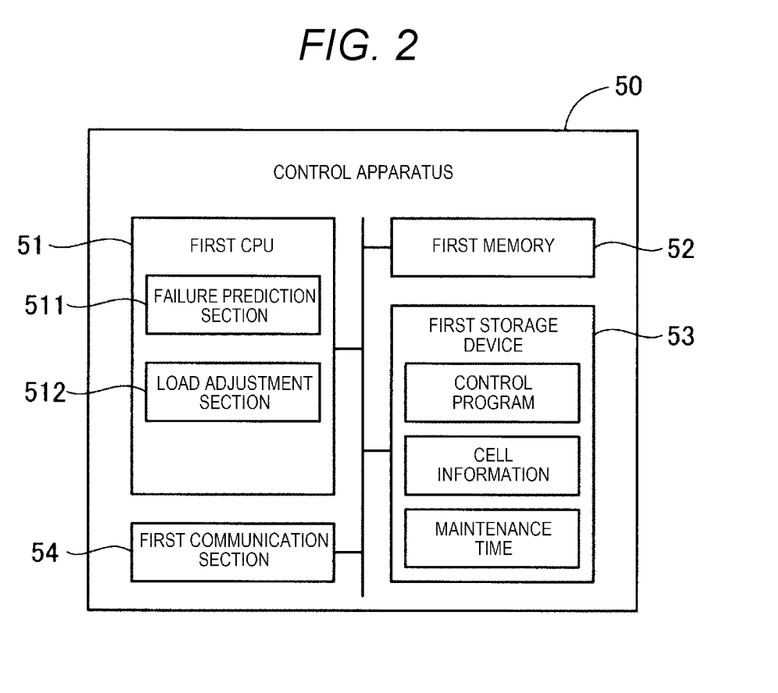
FIG. 2 is a block diagram illustrating a schematic configuration of a controller.

FIG. 2 is a block diagram illustrating a schematic configuration of the controller 50. The controller 50 is configured as a computer including a first CPU 51 and a first memory 52. The controller 50 further includes a first storage device 53 and a first communication section 54 for communicating with each of the robots 30. The first CPU 51 operates as a failure prediction section 511 and a load adjustment section 512 by loading a control program stored in the first storage device 53 into the first memory 52 and executing the control program.

The failure prediction section 511 acquires operation information from each of the robots 30 via the first communication section 54 and predicts a failure time for each of the robots 30 based on the acquired operation information. The operation information includes a command value for driving each component of the robot 30 and an output value of a sensor provided in each component. In the embodiment, the failure prediction section 511 predicts the respective failure times of the plurality of the components configuring each of the robots 30, and a failure time of a component of which the predicted failure time is the earliest among the respective failure times is determined as the failure time of the robot 30.

The failure time of each component can be predicted by various known methods. For example, the failure prediction section 511 can predict the failure time of the servomotor based on a time change of a difference between a speed command value to the servomotor included in an arm or an end effector of the robot 30, and an actual speed value calculated based on an output value from an encoder. The failure prediction section 511 determines that a failure does not occur in the servomotor when the difference does not exceed a predetermined threshold and determines that a failure occurs in the servomotor when the difference exceeds the threshold. If it is determined that the failure occurs in the servomotor, the failure prediction section 511 can predict the failure time by calculating a time until the difference increases up to a predetermined reference value based on a time change rate of the difference so far. The failure prediction section 511 detects an amplitude of a vibration generated in the servomotor based on an output value from the encoder or an output value of a vibration sensor and can predict the failure time of the servomotor based on the time change of the amplitude. The failure prediction section 511 determines that the failure does not occur in the servomotor when the amplitude does not exceed the predetermined threshold and determines that the failure occurs in the servomotor when the amplitude exceeds the threshold. If it is determined that the failure occurs in the servomotor, the failure prediction section 511 can predict the failure time by calculating a time until the amplitude increases up to a predetermined reference value based on a time change rate of the amplitude so far. The failure prediction section 511 is not limited to these methods and may predict the failure time based on a change in a current value supplied to each component, a change in a response time of an output signal with respect to an input signal, or the like.

The load adjustment section 512 adjusts the work load of each of the robots 30 according to the predicted failure time of each of the robots 30, so that each of the robots 30 operates until the maintenance time determined in common to each of the robots 30. In other words, the load adjustment section 512 adjusts the work load of each of the robots 30 according to the predicted failure time of each of the robots 30, so that the failure time of each of the robots 30 comes at the maintenance time determined in common to each of the robots 30. Information indicating the maintenance time is stored in advance in the first storage device 53. Processing contents executed by the load adjustment section 512 will be described in detail later. In the embodiment, the "maintenance" includes meanings such as replacement, repair, adjustment, inspection, and preparation of the component.

Cell information is stored in the first storage device 53. A correspondence relationship between the manufacturing cell 40 and the robot 30 included in the manufacturing cell 40 is recorded in the cell information. The first storage device 53 can grasp the manufacturing cell 40, to which the robot 30 belongs, for each of the robots 30 by referring the cell information.

Figure 3:
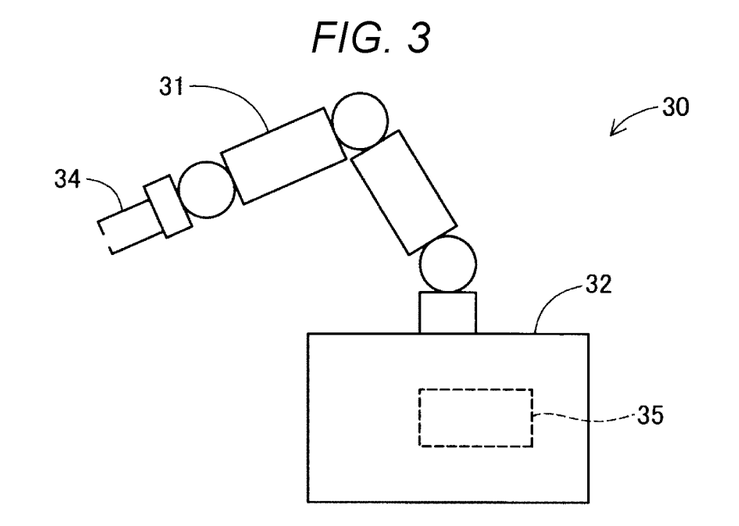
FIG. 3 is a view illustrating a schematic configuration of a robot.

FIG. 3 is a view illustrating a schematic configuration of the robot 30. Each of the robots 30 includes an arm 31 and a base 32. A base end of the arm 31 is fixed to the base 32. An end effector 34 is mounted on a tip of the arm 31. As the end effector 34, any kind of end effector such as a welding gun, a screw fastener, a punch, a cutter, or the like can be mounted. The arm 31 includes a plurality of joints. Each of the joints is provided with the servomotor and the encoder detecting a rotation position of the servomotor. The base 32 is provided with a robot controller 35 for controlling an operation of the robot 30. The robot controller 35 may be configured separately from the robot 30.

Figure 4:
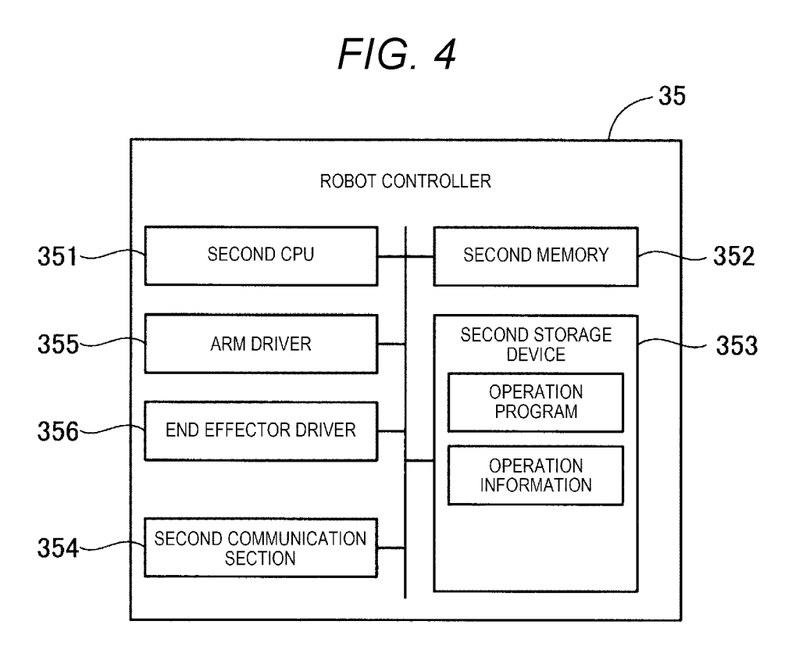
FIG. 4 is a block diagram illustrating a schematic configuration of a robot controller.

FIG. 4 is a block diagram illustrating a schematic configuration of the robot controller 35. The robot controller 35 is configured as a computer including a second CPU 351 and a second memory 352. The robot controller 35 further includes a second storage device 353 and a second communication section 354 communicating with the controller 50. In addition, the robot controller 35 includes an arm driver 355 and an end effector driver 356. The second storage device 353 stores an operation program for controlling an operation of each component such as the arm 31 or the end effector 34 in order for the robot 30 to produce a product.

The second CPU 351 transmits a command for driving the arm 31 to the arm driver 355 according to an operation program stored in the second storage device 353. The arm driver 355 drives the servomotor included in each joint of the arm 31 based on a command received from the second CPU 351. The second CPU 351 transmits a command for driving the end effector 34 to the end effector driver 356 according to an operation program stored in the second storage device 353. The end effector driver 356 drives a motor or various actuators included in the end effector 34 based on a command received from the second CPU 351.

The second CPU 351 sequentially records pieces of operation information of the robot 30 in the second storage device 353. The operation information stored in the second storage device 353 is transmitted to the controller 50 via the second communication section 354 in response to a request from the controller 50.

Figure 5:
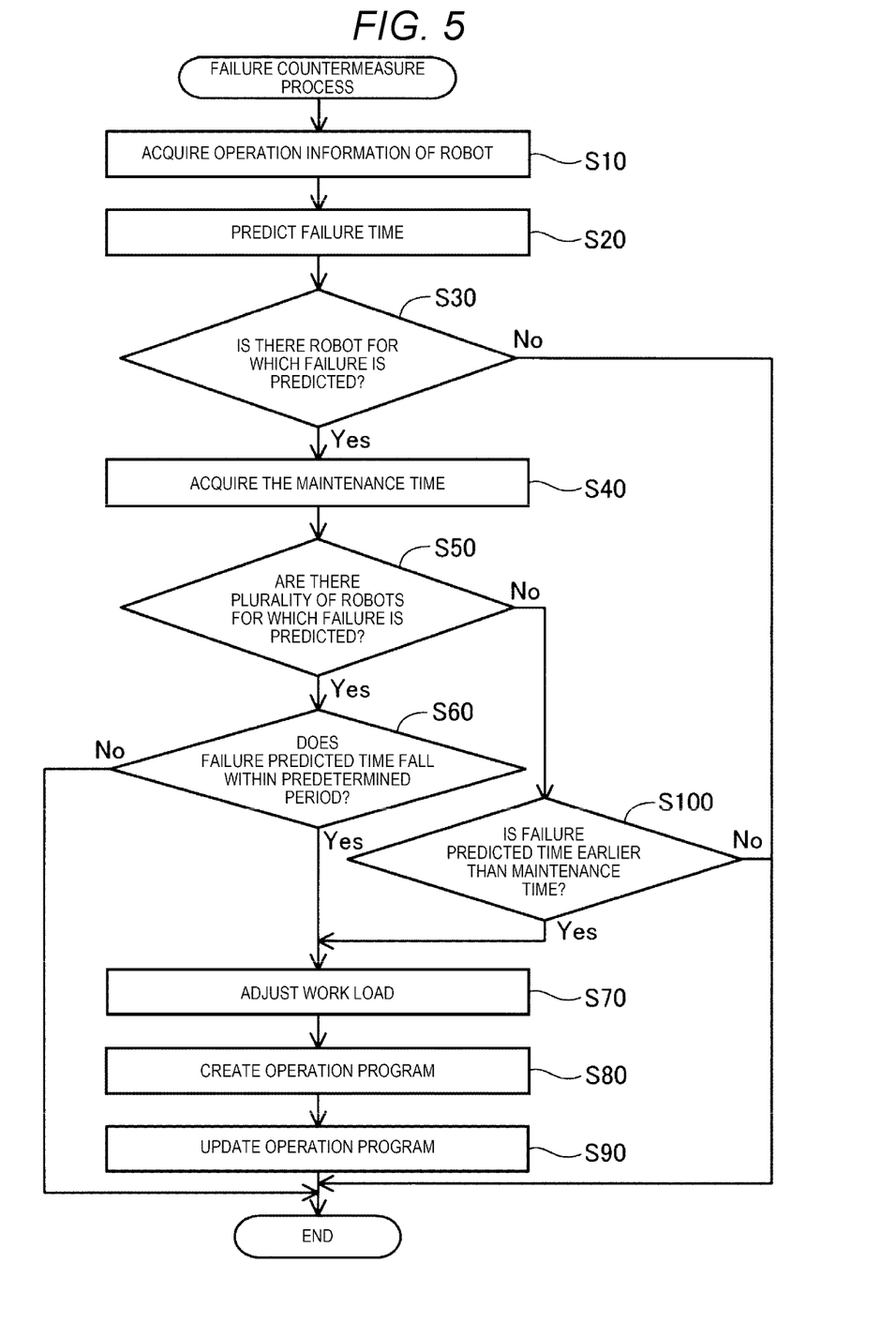
FIG. 5 is a flowchart for explaining a failure countermeasure process.

FIG. 5 is a flowchart for explaining a failure countermeasure process executed by the controller 50. In the embodiment, the failure countermeasure process is performed at regular timing, such as once a day or once a month for each of the manufacturing cells 40.

When the failure countermeasure process is executed by the controller 50, in step S10, the failure prediction section 511 acquires the operation information from each of the robots 30. In step S20, the failure prediction section 511 predicts whether or not each of the robots 30 fails and the failure time of each of the robots 30 based on the acquired operation information. Hereinafter, the predicted failure time is also referred to as a "failure predicted time". In step S30, the controller 50 determines whether or not there is a robot 30 for which a failure is predicted.

In step S30, if it is determined that there is no robot 30 for which a failure is predicted, the controller 50 ends the failure countermeasure process. On the other hand, in step S30, if it is determined that there is a robot 30 for which a failure is predicted, in step S40, the load adjustment section 512 acquires the maintenance time from the first storage device 53. In step S50, the controller 50 determines whether or not there area plurality of the robots 30 for which a failure is predicted. If there are the plurality of the robots 30 for which a failure is predicted, in step S60, the controller 50 determines whether or not the failure predicted time of each of the robots 30 falls within a predetermined period. In the embodiment, the period is a half year including the maintenance time. The period can be determined, for example, according to a cycle of the maintenance time of the robot 30. If it is determined that the failure predicted time of each of the robots 30 does not fall within the predetermined period, the controller 50 ends the failure countermeasure process.

In step S60, it is determined that the failure predicted time of each of the robots 30 is within the predetermined period, in step S70, the controller 50 adjusts the work load of each of the robots 30 for which a failure is predicted. Specifically, for each of the robots 30 for which a failure is predicted, when the failure predicted time is earlier than the maintenance time, the controller 50 reduces the work load, and when the failure predicted time is later than the maintenance time, the controller 50 increases the work load, and adjusts the work load of each of the robots 30, so that all the robots 30 for which a failure is predicted operate until the maintenance time and overall productivity does not decrease. After the adjustment of the work load, in step S80, the controller 50 creates an operation program for realizing the work load adjusted for each of the robots 30. In step S90, the created program is transmitted to the robot controller 35 of each of the robots 30 and each operation program stored in the second storage device 353 is updated.

In step S50, if it is determined that there is one robot 30 for which a failure is predicted, in step S100, the controller 50 determines whether or not the failure predicted time of the robot 30 is earlier than the maintenance time. If the failure predicted time is after the maintenance time, the controller 50 ends the failure countermeasure process. On the other hand, if the failure predicted time is earlier than the maintenance time, in step S70, the controller 50 adjusts the work load of the robot 30, so that the robot 30 fails after the maintenance time. In step S80, the controller 50 creates the operation program for realizing the adjusted work load, in step S90, transmits the created operation program to the robot controller 35 of the robot 30 for which a failure is predicted, and updates the operation program stored in the second storage device 353. If there is one robot 30 for which a failure is predicted, the failure countermeasure process may be ended without executing the determination in step S100.

Figure 6:
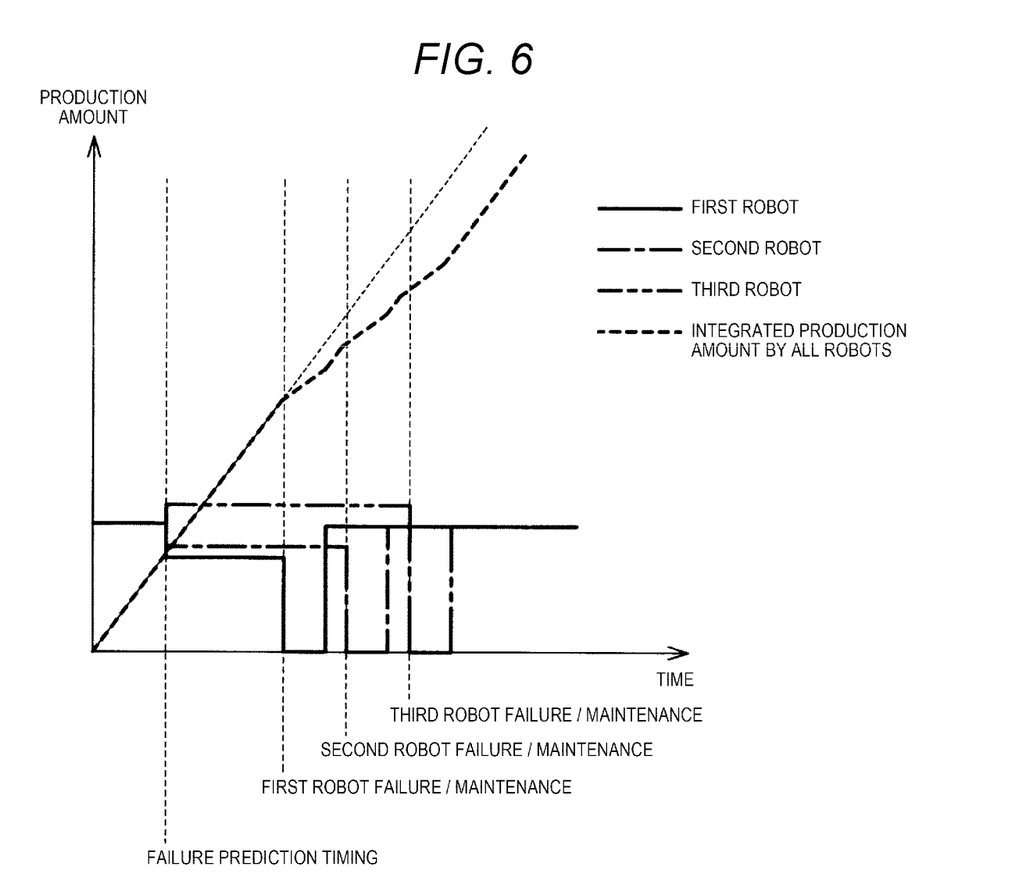
FIG. 6 is a graph for explaining a comparative example of a load adjustment in the embodiment.

FIG. 6 is a graph for explaining a comparative example of the load adjustment in the embodiment. In the graph illustrated in FIG. 6, a horizontal axis represents a time and a vertical axis represents a production amount of products by the first robot 30a, the second robot 30b, and the third robot 30c. In the comparative example illustrated in FIG. 6, in an initial state, each of the robots 30 produces a product with a fixed production amount. The failure is predicted at a certain timing, and the adjustment of the production amount of each of the robots 30 is performed to secure an entire production amount according to a predicted result. However, in the adjustment, the maintenance time is not particularly considered. As a result, in each of the robots 30, the failure times come at different timings, and maintenance work is required each time.

Figure 7:
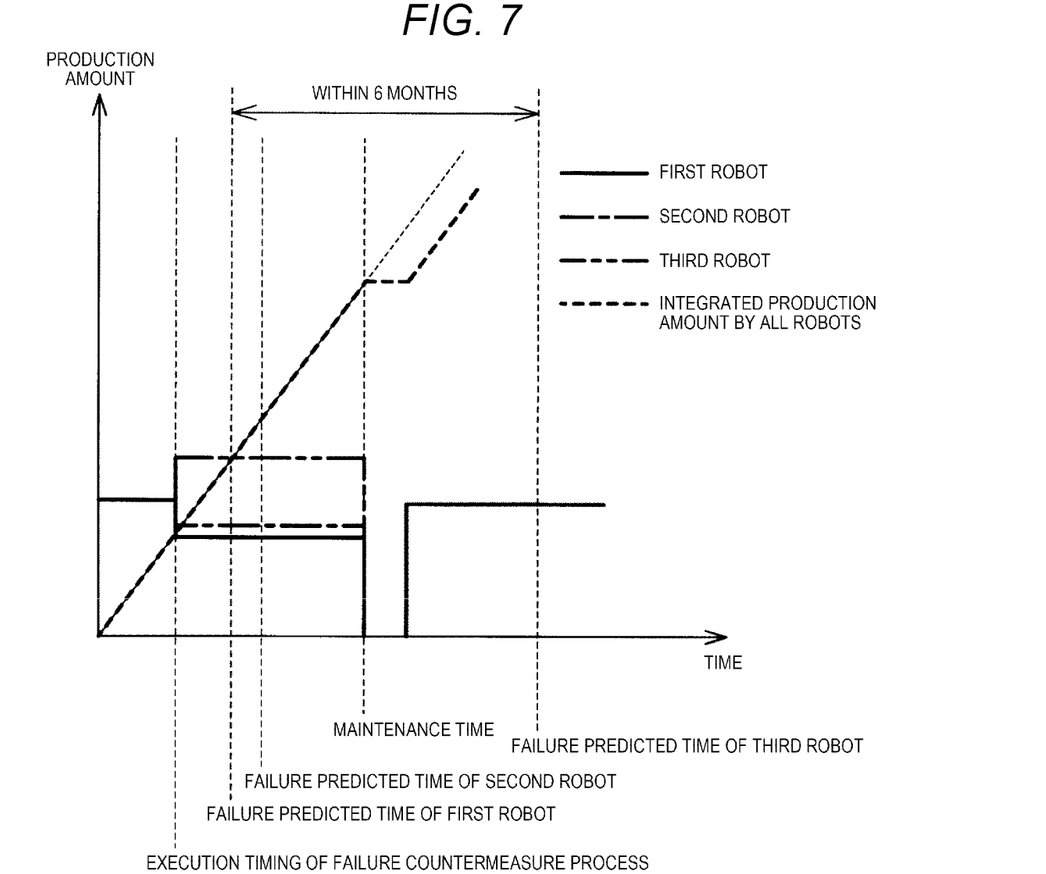
FIG. 7 is a graph for explaining an example of a load adjustment in the embodiment.

FIG. 7 is a graph for explaining an example of the load adjustment in the embodiment. Also in the example illustrated in FIG. 7, similar to the comparative example illustrated in FIG. 6, in the initial state, each of the robots 30 produces a product with a fixed production amount. At certain timing, the failure countermeasure process illustrated in FIG. 5 is executed and the failure time of each of the robots 30 is predicted. The work load of each of the robots 30 is adjusted by the controller 50 according to the failure predicted time of each of the robots 30. Specifically, for each of the robots 30 for which a failure is predicted, when the failure predicted time is earlier than the maintenance time, the controller 50 reduces the work load by lowering the production amount per unit time by lowering the operation speed, and when the failure predicted time is later than the maintenance time, the controller 50 increases the work load by increasing the production amount per unit time by increasing the operation speed, and adjusts the work load of each of the robots 30, so that the failure time of all the robots 30 for which a failure is predicted comes to the maintenance time. In the example illustrated in FIG. 7, for the first robot 30a and the second robot 30b, since the failure predicted time is earlier than the maintenance time, the production amount is lowered, and for the third robot 30c, since the failure predicted time is later than the maintenance time, the production amount is increased to compensate for the reduction in the production amounts of the first robot 30a and the second robot 30b. That is, the load adjustment section 512 adjusts the production amount of each of the robots 30, so that the production amount of the product in the manufacturing cell 40 does not change before and after the adjustment of the work load. After the work load is adjusted as described above, when the predetermined maintenance time comes, maintenance work is simultaneously performed for all the robots 30 for which a failure is predicted regardless of whether or not a failure actually occurs at the timing.

As described above, in the embodiment, unlike the comparative example illustrated in FIG. 6, the work load is adjusted so that each of the robots 30 is operated until the maintenance time determined in common to each of the robots 30. Therefore, maintenance work can be performed at the same timing for each of the robots 30. As a result, it is possible to reduce a labor cost for maintenance work and the cost for security maintenance, and therefore, it is possible to suppress the decrease in the productivity of the factory or the manufacturing cell 40. In particular, in a factory where it is necessary to stop the operation of the entire manufacturing cell 40 or the entire factory for security maintenance, in the embodiment, maintenance work can be performed at once as compared with the comparative example in which the timing of maintenance work varies. Therefore, it is possible to significantly suppress reduction in productivity.

In the embodiment, when the failure predicted time of each of the robots 30 falls within a fixed period, the work load of each of the robots 30 is adjusted, so that the failure time of each of the robots 30 comes to the maintenance time. Therefore, when the failure predicted times of respective robots 30 are extremely distant from each other or the like, it is possible to suppress that the work load of the robot 30 is extremely decreased or increased. As a result, it is possible to suppress occurrence of a situation where an original performance of the robot 30 cannot be exhibited or a situation where the robot 30 is operated with a load exceeding the original performance by adjusting the work load.

In the embodiment, for each of the robots 30 for which a failure is predicted, when the failure predicted time is earlier than the maintenance time, the work load is reduced, and when the failure predicted time is later than the maintenance time, the work load is increased. Therefore, it is possible to suppress the reduction in the production amount of all the manufacturing cells 40 or all the factories.

In the embodiment, the failure prediction section 511 specifies the failure predicted time for a plurality of components configuring each of the robots 30, and a failure predicted time of a component of which the failure predicted time is earliest among the failure predicted times is determined as the failure predicted time of the robot 30. Therefore, even when a failure is predicted in a plurality of components, the failure time of the robot 30 can be appropriately determined.

B. Other Embodiments (B-1) In the embodiment, the failure prediction section 511 determines, as the failure predicted time of the robots 30, the failure predicted time of the component of which the failure predicted time is earliest among those of the plurality of the components. On the other hand, the failure prediction section 511 may determine an average value or an intermediate value of the respective failure predicted times of the plurality of the components as the failure predicted time of the robot 30. The failure prediction section 511 may predict the failure time of the robot 30, for example, according to an operation time or a work amount of the robot 30 itself without predicting the failure time for each component.

(B-2) In the embodiment, when the failure predicted time of each of the robots 30 falls within a fixed period, the load adjustment section 512 adjusts the work load of each of the robots 30. However, the load adjustment section 512 may adjust the work load of each of the robots 30 regardless of whether or not the failure predicted time of each of the robots 30 falls within a fixed period.

(B-3) In the embodiment, when the failure predicted times of all the robots 30 for which a failure is predicted do not fall within a fixed period, the load adjustment section 512 does not adjust the work load of each of the robots 30. On the other hand, even when the failure predicted times of all the robots 30 do not fall within a fixed period, the load adjustment section 512 may adjust the work load only for the robot 30 of which the failure predicted time falls within a fixed period, and may not adjust the work load for the robot 30 of which the failure predicted time is out of a fixed period.

(B-4) In the embodiment, the controller 50 performs the failure countermeasure process illustrated in FIG. 5 in unit of the manufacturing cell 40. On the other hand, the controller 50 may execute the failure countermeasure process illustrated in FIG. 5 in the entire factory.

(B-5) In the embodiment, for the adjustment of the work load, the load adjustment section 512 may adjust the work load of each of the robots 30 so as to delay the failure time as much as possible within a range where shipping is available using a product inventory. In this case, the load adjustment section 512 may delay the predetermined maintenance time to match a delayed failure time. The load adjustment section 512 may adjust the work load of each of the robots 30, so that timing of the failure time and the maintenance time of each of the robots 30 falls within a long stop period of the factory.

C. Other Forms

The present disclosure is not limited to the above-described embodiments and can be realized by various configurations without departing from the scope of the disclosure. For example, the technical features of the embodiments corresponding to technical features in respective forms described below can be replaced or combined as appropriate for solving some or all of the above-mentioned problems or achieving some or all of the above-mentioned effects. Also, if the technical features are not described as essential in the present specification, they can be deleted as appropriate.

(1) According to an aspect of the present disclosure, there is provided a controller for controlling a plurality of robots. The controller includes a failure prediction section configured to predict a failure time for each of the robots; and a load adjustment section configured to perform adjustment of a work load of each of the robots according to each of the predicted failure times, so that each of the robots operates until a maintenance time determined in common to each of the robots. According to the robot controller of the aspect, the work load of each of the robots is adjusted, so that each of the robots is operated until the maintenance time determined in common to each of the robots. Therefore, it is possible to suppress reduction in productivity due to variation of the maintenance time.

(2) In the robot controller of the aspect, the load adjustment section may perform the adjustment when each of the predicted failure times falls within a predetermined period and may not perform the adjustment when each of the predicted failure times does not fall within the predetermined period. According to the robot controller of the aspect, for example, when the predicted failure times of respective robots are extremely distant from each other, or the like, it is possible to suppress that the work load of the robot is extremely decreased or increased.

(3) In the robot controller of the aspect, the load adjustment section may perform the adjustment by reducing the work load when the predicted failure time is earlier than the maintenance time, and by increasing the work load when the predicted failure time is later than the maintenance time. According to the robot controller of the aspect, it is possible to effectively suppress the decrease in the productivity.

(4) In the robot controller of the aspect, the failure prediction section may predict the failure time for each of a plurality of components constituting the robot, and may determine, as the failure time of the robot, a failure time of a component of which the predicted failure time is the earliest among those of the plurality of the components. According to the robot controller of the aspect, even when a failure is predicted in a plurality of components, the failure time of the robot can be appropriately determined.

The present disclosure can be realized in various aspects other than the aspect as the controller described above. For example, the present disclosure can be realized in an aspect of a method of controlling a robot, a system including a robot and a controller, a computer program for controlling a robot, a non-temporary tangible recording medium recording the computer program, or the like.

What is claimed is:

1. A controller for controlling a plurality of robots, each of the plurality of robots having a same default work load, such that a default combined work load of the plurality of robots is a combination of a plurality of the default work loads, the controller comprising:
   a failure predictor configured to predict a failure time for each of the robots if each of the robots were to operate at the default work load, such that a plurality of failure times are predicted for the plurality of robots, wherein the predicted failure time is an estimated time for each of the robots to fail to function, a first failure time is an earliest failure time among the plurality of failure times, and a last failure time is a latest failure time among the plurality of failure times; and
   a load adjuster configured to:
      determine whether a time period starting from the first failure time and ending at the last failure time falls within a predetermined period that includes a maintenance time determined in common to each of the robots, the predetermined period including a first sub-period before the maintenance time and a second sub-period after the maintenance time; and
      in response to determining that the time period starting from the first failure time and ending at the last failure time falls within the predetermined period, at least one of the plurality of robots has a predicted failure time that falls within the first sub-period, and at least one of the plurality of robots has a predicted failure time that falls within the second sub-period, perform adjustment of a work load of at least one robot among the plurality of robots according to each of the predicted failure times prior to the earliest failure time and before the predetermined period starts, so that each of the robots operates until the maintenance time, wherein an adjusted combined work load of the plurality of robots remains the same as the default combined work load, and the maintenance time remains the same.

2. The controller according to claim 1, wherein the load adjuster does not perform the adjustment when each of the predicted failure times does not fall within the predetermined period.

3. The controller according to claim 1, wherein for each robot that has a failure time within the predetermined period, the load adjuster performs the adjustment by reducing the work load when the predicted failure time is earlier than the maintenance time, and by increasing the work load when the predicted failure time is later than the maintenance time.

4. The controller according to claim 1, wherein for each robot that has a failure time within the predetermined period, the failure predictor predicts the failure time for each of a plurality of components constituting the robot, and determines, as the failure time of the robot, a failure time of a component of which the predicted failure time is the earliest among those of the plurality of the components.

5. A method of controlling a plurality of robots executed by a controller, each of the plurality of robots having a same default work load, such that a default combined work load of the plurality of roots is a combination of a plurality of the default work loads, the method comprising:

predicting a failure time for each of the robots if each of the robots were to operate at the default work load, such that a plurality of failure times are predicted for the plurality of robots, wherein the predicted failure time is an estimated time for each of the robots to fail to function, a first failure time is an earliest failure time among the plurality of failure times, and a last failure time is a latest failure time among the plurality of failure times;

determining whether a time period starting from the first failure time and ending at the last failure time falls within a predetermined period that includes a maintenance time determined in common to each of the robots, the predetermined period including a first sub-period before the maintenance time and a second sub-period after the maintenance time; and in response to determining that the time period starting from the first failure time and ending at the last failure time falls within the predetermined period, at least one of the plurality of robots has a predicted failure time that falls within the first sub-period, and at least one of the plurality of robots has a predicted failure time that falls within the second sub-period, adjusting a work load of at least one robot among the plurality of robots according to each of the predicted failure times prior to the earliest failure time and before the predetermined period starts, so that each of the robots operates until a maintenance time determined in common to each of the robots, wherein an adjusted combined work load of the plurality of robots remain the same as the default combined work load, and the maintenance time remains the same.

\* \* \* \* \*